United States Patent
McGee et al.

(10) Patent No.: US 7,824,773 B2
(45) Date of Patent: Nov. 2, 2010

(54) SHRINK LABELS OF ORIENTED POLYSTYRENE FILM CONTAINING SMALL RUBBER PARTICLES AND LOW RUBBER PARTICLE GEL CONTENT AND BLOCK COPOLYMERS

(75) Inventors: Robert L. McGee, Midland, MI (US); Stephen J. Skapik, III, Columbus, OH (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 12/306,994

(22) PCT Filed: Jul. 27, 2006

(86) PCT No.: PCT/US2006/029493

§ 371 (c)(1),
(2), (4) Date: Dec. 30, 2008

(87) PCT Pub. No.: WO2008/013542

PCT Pub. Date: Jan. 31, 2008

(65) Prior Publication Data

US 2009/0311472 A1   Dec. 17, 2009

(51) Int. Cl.
*B32B 3/10* (2006.01)
*G09F 3/02* (2006.01)
*C08L 51/00* (2006.01)

(52) U.S. Cl. .................. 428/519; 428/131; 428/515; 428/521; 525/71; 525/86; 525/95; 525/98

(58) Field of Classification Search .................. None
See application file for complete search history.

(56) References Cited

U.S. PATENT DOCUMENTS

| | | | |
|---|---|---|---|
| 3,123,655 A | 3/1964 | Otting et al. | |
| 3,956,254 A * | 5/1976 | St. Eve et al. ............ | 526/352.2 |
| 4,183,878 A * | 1/1980 | Biletch et al. ............. | 525/86 |
| 4,409,369 A | 10/1983 | Lyons et al. | |
| 4,493,922 A | 1/1985 | Echte et al. | |
| 4,572,819 A | 2/1986 | Priddy et al. | |
| 4,585,825 A | 4/1986 | Wesselmann | |
| 4,608,284 A | 8/1986 | Roales | |
| 4,666,987 A | 5/1987 | Burmester et al. | |
| 5,322,664 A | 6/1994 | Blackwelder | |
| 5,491,195 A | 2/1996 | Schrader et al. | |
| 5,643,664 A | 7/1997 | Kwong et al. | |
| 5,733,618 A | 3/1998 | Kwong et al. | |
| 5,753,326 A | 5/1998 | Blackwelder | |
| 6,011,117 A | 1/2000 | Perkins et al. | |
| 6,221,471 B1 | 4/2001 | Salmang et al. | |
| 6,248,807 B1 | 6/2001 | Sosa et al. | |
| 6,489,378 B1 | 12/2002 | Sosa et al. | |
| 6,649,259 B1 | 11/2003 | Hu et al. | |
| 6,821,635 B2 * | 11/2004 | Sugden et al. ............ | 428/519 |
| 6,841,261 B2 | 1/2005 | Matsui et al. | |
| 6,897,260 B2 | 5/2005 | Vynckier | |
| 7,208,547 B2 | 4/2007 | Rego et al. | |
| 2002/0061974 A1 | 5/2002 | Sugden et al. | |
| 2002/0107323 A1 * | 8/2002 | Uzee et al. ................ | 525/95 |
| 2003/0008972 A1 | 1/2003 | Kato et al. | |
| 2003/0055164 A1 | 3/2003 | Yang | |
| 2003/0055177 A1 | 3/2003 | Demirors | |
| 2003/0149183 A1 | 8/2003 | Sugden et al. | |
| 2004/0102576 A1 | 5/2004 | Matsui et al. | |
| 2004/0242786 A1 * | 12/2004 | Vynckier .................. | 525/241 |
| 2005/0009990 A1 * | 1/2005 | Knoll et al. ............... | 525/89 |
| 2006/0084761 A1 | 4/2006 | Rego et al. | |
| 2009/0028958 A1 | 1/2009 | Blin et al. | |

FOREIGN PATENT DOCUMENTS

| | | | |
|---|---|---|---|
| DE | 3425458 A1 | 1/1986 |
| EP | 0113067 A1 | 7/1984 |
| EP | 0143500 A2 | 6/1985 |

(Continued)

OTHER PUBLICATIONS

Data Sheet for K Resin KR05 (no date available).*

(Continued)

*Primary Examiner*—David R Sample
*Assistant Examiner*—Jeff A Vonch

(57) ABSTRACT

A polymer composition containing (a) a high impact polystyrene (HIPS) component with a block copolymer grafted to polystyrene, a rubbery conjugated diene content of one to seven weight percent based on HIPS weight, less than 10 weight-percent gel concentration, an average rubber particle size of between one and 0.01 micrometers, about 40 to about 90 volume percent of the rubber particles have diameters of less than about 0.4 microns and from about 10 to about 60 volume percent of the rubber particles have diameters between about 0.4 and about 2.5 microns, a majority of rubber particles with a core/shell morphology and a concentration that accounts for 10 to 70 weight-percent of the total polymer composition weight and one to five weight-percent rubbery diene based on total polymer composition weight; (b) from 10 to 70 weight percent of a general purpose polystyrene and from about 2 to about 80 weight-percent of a styrene block copolymer component, both based on total polymer composition weight. In a film, preferably oriented, wherein the polymer composition accounts for at least 95 weight-percent of the film, with the balance of the film or film composition weight being additives. Shrink labels are made from the film.

18 Claims, No Drawings

FOREIGN PATENT DOCUMENTS

| | | |
|---|---|---|
| EP | 0151268 A1 | 8/1985 |
| EP | 0167707 A1 | 1/1986 |
| EP | 0196013 A2 | 10/1986 |
| EP | 0796895 | 9/1997 |
| EP | 0796895 A1 | 9/1997 |
| GB | 862966 | 3/1961 |
| JP | 58005355 A | 1/1983 |
| JP | 3-146331 A | 6/1991 |
| JP | 3146331 A | 6/1991 |
| JP | 03227327 A | 10/1991 |
| JP | 05017596 A | 1/1993 |
| JP | 3-521000 B2 | 5/1994 |
| JP | 11080467 A | 3/1999 |
| JP | 3-481478 B2 | 5/2000 |
| JP | 3481478 B2 | 5/2000 |
| JP | 2000-351860 A | 12/2000 |
| JP | 2001-290425 A | 10/2001 |
| JP | 2002-080074 A | 3/2002 |
| JP | 2002-137292 | 5/2002 |
| JP | 2002-137292 A | 5/2002 |
| JP | 2002-146052 A | 5/2002 |
| JP | 2003-155356 A | 5/2003 |
| JP | 2005-139277 A | 6/2005 |
| WO | WO 99/09080 A1 | 2/1999 |
| WO | WO 2004/072155 A2 | 8/2004 |
| WO | WO 2006/044114 A1 | 4/2006 |
| WO | WO 2007/016376 A1 | 2/2007 |
| WO | WO 2008/013542 A2 | 1/2008 |

OTHER PUBLICATIONS

U.S. Appl. No. 11/988,409, filed Jan. 7, 2008, Ludovic.

*Thermoplastic Elastomers* $2^{nd}$ *Edition*; Hanser/Gardner Publications, Inc., 1996, ISBN 1-5990-205-4, pp. 48-70.

*Anionic Polymerization: Principles and Practical Applications*, Marcel Dekker Inc., 1996, ISBN 0-8247-9523-7, pp. 307-321 and 475-516.

*Journal of Applied Polymer Science*, vol. 77 (2000), p. 1165, "A Novel Application of Using a Commercial Fraunhofer Diffractometer to Size Particles Dispersed in a Solid Matrix", Jun Gao and Chi Wu.

\* cited by examiner

SHRINK LABELS OF ORIENTED POLYSTYRENE FILM CONTAINING SMALL RUBBER PARTICLES AND LOW RUBBER PARTICLE GEL CONTENT AND BLOCK COPOLYMERS

BACKGROUND OF THE INVENTION

1. Field of the Invention

The present invention relates to oriented rubber-reinforced polystyrene film that has a preferential orientation in the stretched direction and a shrink-label film comprising such a polystyrene film as well as a composition useful for making such films.

2. Description of Related Art

Shrink labels generally fall into two categories: roll-on shrink-on (ROSO) labels and sleeve-type labels; sleeve labels are also sometimes referred to as tube labels. ROSO labels are film sheets that wrap around a container. Sleeve labels are tubular in configuration and fit around a container by placement over the container, such that the container is surrounded by the tube. Application of heat to a shrink label that is around a container causes the label to shrink and conform to the container.

To conform to a container, each type of label must shrink preferentially (that is, to a greater extent than in any other direction) in the direction extending circumferentially around the container. ROSO films usually reside on a container with the machine direction (MD) of the film extending circumferentially around the container. Hence, ROSO films primarily shrink in the film's machine direction (MD) due to preferential machine direction orientation (MDO). In contrast, sleeve labels usually reside on a container with the label's transverse direction (TD) extending circumferentially around the container. Hence, sleeve labels shrink primarily in the film's transverse direction (TD) due to preferential transverse direction orientation (TDO).

While ROSO labels offer advantages in production speed, sleeve labels historically have enjoyed an advantage in extent of shrinkage around a container. Sleeve labels typically shrink up to 70 percent (%) around the circumference of a container. Sleeve labels, which either have no glue joint or have a glue joint that is extensively cured prior to application to a container, can tolerate a greater extent of stress during shrinkage.

Sleeve labels historically enjoy more extensive shrinkage and therefore have conformed better to contoured containers than ROSO labels. However, ROSO labels have a production advantage of being oriented in the machine direction, that is the direction they travel through machinery used during their production. It, therefore, desirable to identify an oriented film suitable for preparing a ROSO label that can shrink circumferentially around a container to a greater extent than polypropylene ROSO labels but preferably without the detriment of failure at the glue joint of the label.

Polystyrene (PS) is a particularly desirable polymer for shrink labels. Shrink label films of polypropylene (PP), for example, typically shrink only up to about 20% in any direction at a temperature below 120° C. The crystalline nature of PP requires heating above the PP's crystalline melt temperature to release additional orientation. In contrast, PS-based shrink label films only need to exceed the polymer's glass transition temperature (which generally is lower than PP's crystalline melt temperature) due to its amorphous character. Therefore, PS films can desirably provide greater shrink at lower processing temperatures than PP films.

Additionally, PS retains a higher surface energy after corona treatment (typically needed to render the surface of a polymer film suitable for printing) for extended periods of time relative to PP. Therefore, unlike PP films, corona treatment of PS films can occur during manufacture rather than just prior to printing into labels.

In contrast to copolyester and polyvinyl chloride (PVC) films, use of PS films facilitate bottle and label recyclability, as the lower density allows the label to be easily separated from the higher density (for example, polyester) bottles. Furthermore, the lower PS density advantageously provides a higher film yield, or more area/lb. or kg of film. Higher density labelstock, such as copolyester or PVC films, do not provide similar advantages.

Polystyrene-based shrink label films can include a high impact polystyrene (HIPS) component in order to improve label toughness (for example, tear resistance). However, rubber particles in a typical HIPS range have an average particle size of greater than one micrometer (see, for example, U.S. Pat. No. 6,897,260, column 4, lines 26-27). Large rubber particles tend to decrease clarity of a label film, interfering with the use of the film for reverse side printing (printing on the side of a label film proximate to the container so that it is readable through the film) as well as with viewing of the container or product through the label. Typical HIPS also contains greater than 7 percent rubber based on total HIPS weight. High concentrations of rubber can hinder the printability of a film, decrease clarity of a film, reduce dimensional stability and undesirably increase gel amount in a final film. However, in some situations such as small diameter bottles or bottle necks, HIPS alone may not supply sufficient toughness to avoid a tendency to split under stress.

It is desirable to have an oriented PS film that is suitable for shrink label applications. It is further desirable for the film to contain a high impact polystyrene of a type that has smaller rubber particles and lower rubber concentrations than that of typical HIPS in order to achieve film toughening without substantially hindering printability or clarity of the film. It is further desirable for the film to contain clear impact resistant polystyrene based on block copolymer technology to further improve film toughness. It is still further desirable if such a film can serve as a shrink label that demonstrates circumferential shrink around a container comparable to that achieved with PVC or polyester.

BRIEF SUMMARY OF THE INVENTION

The present invention advances shrink-label art by providing an oriented polystyrene-based film suitable for use as a shrink label and that contains HIPS with a rubber particle size and rubber concentration below that of typical HIPS, as well as an polystyrene block copolymer for improved toughness, impact resistance or a combination thereof, and a general purpose polystyrene. The present invention can provide a rubber-reinforced polystyrene film, and shrink label comprising such a film, that surprisingly has one or more of high clarity, adequate stiffness for high speed printing as indicated by preferred ranges of 1% secant modulus both MD and TD from 90,000 to 300,000 lb/in$^2$ (620 to 2070 MPa), and high shrinkage in the direction of stretching as demonstrated by preferred ranges of shrink ratio from 20 to 80% in the primary stretched direction when measured in free air at 110° C. for 10 minutes.

In a first aspect, the present invention is a polymer composition, said polymer composition consisting of: (a) At least one high impact polystyrene (HIPS) component having: (i) a block copolymer of styrene and a rubbery conjugated diene, wherein the copolymer is grafted to a polystyrene; (ii) optionally, two weight-percent or more and 8 weight-percent or less of a rubber homopolymer based on the HIPS component weight; (iii) a total rubbery conjugated diene content of one weight percent or more and seven weight percent or less based on total weight of the HIPS component; (iv) less than 10 wt % gel concentration by methyl ethyl ketone/methanol extraction; (v) an average rubber particle size of less than 1.0 micrometers and 0.01 micrometers or more; (vi) about 40 to about 90 volume percent of the rubber particles with diameters of less than about 0.4 microns and from about 10 to about 60 volume percent of the rubber particles with diameters between about 0.4 and about 2.5 microns; (vii) a majority of rubber particles with a core/shell morphology; (viii) and that is present at a concentration of at least about 10 weight percent and up to at most about 70 weight percent of the polymers in the composition and accounts for one or more and five or less percent by weight of rubbery diene weight relative to total composition weight; and (b) at least one general purpose polystyrene having a weight-average molecular weight of more than 200,000 grams per mole and 350,000 grams per mole or less and that is present at a concentration of at least about 10 weight percent and up to at most about 50 weight percent of the polymers in the composition; and (c) at least one styrene block copolymer that is present at a concentration of at least about 2 weight percent and up to at most about 80 weight percent of the polymers in the composition; (a), (b) and (c) account for 100 percent by weight of the polymers in the polymer composition. This polymer composition is optionally admixed with additives within the skill in the art up to about 5 weight percent of the combined weight of polymer composition and additives to make a film composition, that is a composition suitable for making films.

In a second aspect the invention is an oriented film consisting 95 to 100 weight percent the polymer composition of the invention and 0 to 5 weight percent additives where the percentages are based on the combined weight of polymers and additives; and wherein preferably the film has a ratio in the primary direction stretched (usually MDO for ROSO or TDO for sleeve applications) of more than 4:1, more preferably 6:1 and a ratio in the direction of less stretch of 1.2:1 or less and wherein the ratio in the direction that received more stretch is greater than the ratio in the other direction.

In a third aspect, the present invention is a shrink label comprising a axially unbalanced oriented polymer film (that is, a film having a different amount of orientation in the MD than in the TD) of the first aspect wherein the film preferably has printing on one or both sides. The shrink label is preferably either a ROSO or a sleeve label, most preferably a sleeve label.

DETAILED DESCRIPTION OF THE INVENTION

Films of the present invention comprise a polymer composition comprising a HIPS component, a general purpose polystyrene (GPPS), and a styrene block copolymer component. The combination of the HIPS component, GPPS and styrene block copolymer component account for 100 percent by weight (wt %) of the polymers in the composition aside from additives, that is the polymer composition. The polymer composition desirably accounts for 95 wt % or more, preferably 97 wt % or more, and can comprise 100 wt % of the total weight of the film composition or the film. When the polymer composition is less than 100 wt % of the film weight, the balance to 100 wt % consists of additives, including any additives that may be part of the HIPS component, GPPS, and styrene block copolymer components as obtained commercially or by manufacture. Additives include fillers, processing aids, slip agents, or plasticizers within the skill in the art and optionally include polymeric additives.

All percentages, preferred amounts or measurements, ranges and endpoints thereof herein are inclusive, that is, "less than about 10" includes about 10. "At least" is, thus, equivalent to "greater than or equal to," and "at most' is, thus, equivalent "to less than or equal to." A number "or more" is equivalent to "at least" that number. Similarly. "or less" after a number is equivalent to "at most" the number. Numbers herein have no more precision than stated. Thus, "105" includes at least from 104.5 to 105.49. Furthermore, all lists are inclusive of combinations of two or more members of the list. All ranges from a parameters described as "at least," "greater than," "greater than or equal to" or similarly, to a parameter described as "at most," "up to," "less than," "less than or equal to" or similarly are preferred ranges regardless of the relative degree of preference indicated for each parameter. Thus a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise, except that percentages of monomers in a polymer are weight percentages unless stated otherwise. Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and may be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter may be acceptable to achieve another desirable end.

The term "comprising", is synonymous with "including," "containing," or "characterized by," is inclusive or open-ended and does not exclude additional, unrecited elements, material, or steps. The term "consisting essentially of" indicates that in addition to specified elements, materials, or steps; elements, unrecited materials or steps may be present in amounts that do not unacceptably materially affect at least one basic and novel characteristic of the subject matter. The term "consisting of" indicates that only stated elements, materials or steps are present. The term "comprising" is inclusive of "consisting essentially of" and "consisting of."

The HIPS component is a styrene polymer containing a grafted rubber component. Grafting of a rubber component into a polystyrene tends to increase toughness and mechanical strength of the polystyrene. Binding the rubber to the polystyrene through grafting has technical advantages over simply blending polystyrene with a rubber component. Binding the rubber generally provides a material with a higher modulus and equivalent impact strength with a lower rubber content than a simply blended rubber. Graft the rubber component into the styrene polymer by combining the rubber component with styrene monomers, typically by dissolving the rubber in styrene monomers prior to polymerizing the styrene monomers. Polymerizing the styrene monomers then produces a matrix of polystyrene containing rubber grafted to styrene polymers.

The polystyrene matrix typically has a sufficiently high weight average molecular weight (Mw) to provide a desirable level of processability and mechanical properties in the composition, which is typically a Mw of at least 100,000, preferably at least about 120,000, more preferably at least about 130,000 and most preferably at least about 140,000 grams per mole (g/mol). The polystyrene typically has a Mw that is less than or equal to about 260,000, preferably less than or equal to about 250,000, more preferably less than or equal to about 240,000 and most preferably less than or equal to about 230,000 g/mol in order to provide sufficient processability. Measure polystyrene matrix Mw by using gel permeation chromatography using a polystyrene standard for calibration.

The rubber component is a copolymer of a rubbery conjugated diene and styrene (rubber copolymer) or a blend comprising both the rubber copolymer and a minor amount of a rubbery conjugated diene homopolymer (rubber homopolymer). The conjugated diene in both rubbers is typically a 1,3-alkadiene, preferably butadiene, isoprene or both butadiene and isoprene, most preferably butadiene. The conjugated diene copolymer rubber is preferably a styrene/butadiene (S/B) block copolymer. Polybutadiene is a desirable rubber homopolymer.

The rubber copolymer desirably has a Mw of 100,000 g/mol or more, preferably 150,000 g/mol or more and desirably 350,000 g/mol or less, preferably 300,000 g/mol or less, more preferably 250,000 g/mol or less. Measure Mw using Tri Angle Light Scattering Gel Permeation Chromatography.

The rubber copolymer also desirably has a solution viscosity in the range of from about 5 to about 100 centipoise (cP) (about 5 to about 100 milliPascal-second (mPa*s)), preferably from about 20 to about 80 cP (about 20 to about 80 mPa*s); and cis content of at least 20%, preferably at least 25% and more preferably at least about 30% and desirably 99% or less, preferably 55% or less, more preferably 50% or less. Buna BL 6533 T brand rubber and other similar rubbers are desirable examples of rubber copolymers.

Including rubber homopolymer with a rubber copolymer when preparing the HIPS component can contribute to the mechanical performance of the HIPS polymer by enhancing the amount of elongation at rupture. Suitable rubber homopolymers desirably have a second order transition temperature of zero degrees Celsius (° C.) or less, preferably −20° C. or less. Preferably, the rubber homopolymer has a solution viscosity in the range of about 20 to about 250 cP (about 20 to about 250 mPa*s), more preferably from about 80 cP to 200 cP (about 80 to about 200 mPa*s). The rubber homopolymer desirably has a cis content of at least about 20%, preferably at least about 25% and more preferably at least about 30% and desirably about 99% or less, preferably 55% or less, more preferably 50% or less. Desirably rubber homopolymers have a Mw of 100,000 g/mol or more, more preferably 150,000 g/mol or more and desirably 600,000 g/mol or less, preferably 500,000 g/mol or less. Measure Mw by Tri Angle Light Scattering Gel Permeation Chromatography). An example of a suitable rubber homopolymer is Diene™ 55 brand rubber (Diene is a trademark of Firestone).

Rubber homopolymer, when present, will typically comprise at least about 2 wt %, preferably at least about 4 wt %, more preferably at least about 6 wt % and most preferably at least about 8 wt % based on total rubber weight in the HIPS polymer. In order to avoid unnecessarily low transparency or clarity, the rubber homopolymer content is desirably 25 wt % or less, preferably 20 wt % or less, more preferably 16 wt % or less and most preferably 12 wt % or less based on total rubber weight.

The HIPS component has a total diene-component content from the rubber component (that is, content arising from rubbery conjugated diene of both rubber copolymer and rubber homopolymer when preparing the HIPS component) of about one wt % or more, preferably 1.5 wt % or more, more preferably 2 wt % or more, still more preferably 2.5 wt % or more and most preferably 3 wt % or more based on weight of the HIPS component. Rubber concentrations below about 1 wt % fail to obtain a desirable level of mechanical strength and toughness. In order to provide desirable transparency, the rubber concentration is typically 7 wt % or less, preferably 6 wt % or less, more preferably 5 wt % or less, even more preferably 4 wt % or less, based on total weight of the HIPS component.

Without being bound by theory, lower rubber concentrations, such as 7 wt % or less based on HIPS, is desirable to avoid extensive crosslinking in the rubber particle and reduce the likelihood of gel formation. While some crosslinking in the rubber is desirable to maintain the integrity of the rubber during shearing in manufacture, extensive crosslinking can hinder a rubber particle's ability to deform during film orientation. Clarity and transparency of a film increase as rubber particles deform into particles with higher aspect ratios. Rubber particles with less crosslinking tend to deform and retain their deformed shape more readily than higher crosslinked rubber particles, making the lower crosslinked particles more amenable to clear and transparent films. Defining a specific rubber concentration where crosslinking becomes undesirably extensive is difficult since it depends on specific processing conditions. Even so, rubber concentrations of 12 wt % or more based on HIPS weight, tend to have undesirably extensive crosslinking.

Similarly, without being bound by theory, films of the present invention likely benefit from having a lower gel formation as a result of a lower rubber concentration. Gels form by extensive crosslinking of rubber agglomerates which fail to shear into small particles during film manufacture. Crosslinked gel agglomerates can cause difficulty in film manufacture, for instance by causing bubble breaks in a blown film process. Gel agglomerates also have a detrimental effect on film quality, appearing as non-uniform defects in the film and causing dimples in films wound over the agglomerate particle. The dimples tend to pose problems during printing by precluding ink reception on dimpled spots of a film's surface.

The HIPS component further has a gel concentration according to a methyl ethyl ketone/methanol extraction of less than 10 wt %, relative to total HIPS component weight. Such a low gel concentration is desirable to maximize film clarity. Conduct the methyl ethyl ketone/methanol extraction similar to the method of Unexamined Japanese Patent Application Kokai No. P2000-351860A for determining gel concentration. In essence, dissolve a sample of the HIPS (sample weight is W1) into a mixed solvent methyl ethyl ketone/methanol (10:1 volume ratio) at room temperature (about 23° C.). Separate the insoluble fraction by centrifugal separation. Isolate and dry the insoluble fraction. The weight of the isolated and dried insoluble fraction is W2. The gel concentration in wt % is 100×W2/W1.

The HIPS component has a volume average rubber particle size of less than one micrometer (μm), preferably 0.5 μm or less and generally 0.01 μm or more, preferably 0.1 μm or more and more preferably 0.3 μm or more. Such a volume average rubber particle size is in contrast to conventional HIPS materials, which have an average rubber particle size of at least one μm (see, for example, U.S. Pat. No. 6,897,260B2, column 4, lines 22-34; which illustrates the skill in the art and is incorporated herein by reference to the fullest extent permitted by law). Small rubber particle sizes are desirable because they tend to produce films with higher clarity and lower haze than films with larger rubber particles. However, rubber particles below 0.01 μm tend to contribute little to the durability of a composition despite their transparency and clarity.

The rubber particles in the HIPS component have a broad particle size distribution where the majority of the particles are smaller and only a limited amount of particles are larger. In particular, it is desirable to have a distribution where from about 40 to about 90 volume percent (vol %) of the particles have diameters less than about 0.4 μm. Correspondingly, it is desirable to have a distribution of relatively large particles where from about 10 to about 60 vol % of the particles have diameters greater than about 0.4 μm and less than about 2.5, preferably from about 15 to 55 vol % and more preferably from about 20 to about 50 vol % of the particles have diameters greater than or equal to about 0.5 μm and less than or equal to about 2.5 μm. Preferably, for this component of relatively large particles, the specified percentage amounts of the particles have diameters less than about 2 μm, more preferably about 1.5 μm or less, still more preferably about 1.2 μm or less, even more preferably about 1 μm or less.

Rubber particle size is a measure of rubber-containing particles, including all occlusions of monovinylidene aromatic polymer within the rubber particles. Measure rubber particle size with a Beckham Coulter: LS230 light scattering instrument and software. The manufacturer's instructions and literature (JOURNAL OF APPLIED POLYMER SCIENCE, VOL. 77 (2000), page 1165, "*A Novel Application of Using a Commercial Fraunhofer Diffractometer to Size Particles Dispersed in a Solid Matrix*" by Jun Gao and Chi Wu) provide a method for measuring rubber particle size with the Beckham Coulter. Preferably, using this equipment and software, the optical model for calculating the rubber particle size and distribution statistics is as follows: (i) Fluid Refractive Index of 1.43, (ii) Sample Real Refractive Index of 1.57 and (iii) Sample Imaginary Refractive Index of 0.01.

The majority of the rubber particles, preferably 70% or more, more preferably 80% or more, more preferably 90% or more of the rubber particles in the HIPS component will have a core/shell particle morphology. Core/shell morphology means that the rubber particles have a thin outer shell and contain a single, centered occlusion of a matrix polymer. This type of particle morphology is commonly referred to as "single occlusion" or "capsule" morphology. In contrast, the terms "entanglement" or "cellular" morphology refer to various other, more complex rubber particle morphologies that include "entangled", "multiple occlusions", "labyrinth", "coil", "onion skin" or "concentric circle" structures. Determine the percentage of rubber particles having a core/shell morphology as a numerical percentages from 500 particles in a transmission electron micrograph photo of the HIPS component.

Core-shell particles in the HIPS component are crosslinked to the degree that they will stretch but not break under shear fields (that is, during an orientation process). Their thin walls (as a result of high compatibility coming from the presence of copolymer rubbers) will become even thinner but remain intact to provide the needed mechanical and tensile strength properties. Presumably, upon film orientation, the oriented rubber morphology is very close to a co-continuous distribution of very thin ribbons of rubber, possibly as a result of a low amount of multi-occlusion particles in the system (cellular morphology). The very thin shell walls have better light transmittance than would result with thicker walls and definitely better than if there were residual cellular or multi-occlusion particles, which do not distribute as very thin ribbons upon orientation.

The HIPS component is optionally free of or optionally contains other additives such as mineral oil or other plasticizers. Appropriate amounts of mineral oil can improve mechanical properties such as elongation at rupture. The HIPS component will typically contain at least about 0.4 wt %, preferably 0.6 wt % or more, more preferably 0.8 wt % or more and still more preferably 1 wt % or more mineral oil based on total weight of the HIPS component. In order to obtain a desirable clarity, the HIPS component will generally contain less than about 3 wt %, preferably 2.8 wt % or less, more preferably 2.6 wt % or less and most preferably 2.4 wt % or less mineral oil based on total weight of the HIPS component.

A suitable material for use as the HIPS component is that described in U.S. Pregrant Publication 2006-0084761 entitled: IMPROVED RUBBER MODIFIED MONOVINYLIDENE AROMATIC POLYMERS AND THERMOFORMED ARTICLES.

The HIPS component differs from standard, mass or solution polymerized HIPS in that the rubber particle size distribution is relatively broad and the majority of the rubber particles have a core-shell morphology. In contrast, conventional HIPS resins tend to have a relatively narrow particle size distribution and have predominantly or at least a larger percentage of cellular, multi-occlusion particle structure.

Compositions and films of the present invention contain preferably at least about 10, more preferably at least about 20, most preferably at least about 25 and at most preferably at most about 70, more preferably at most about 65, most preferably at most about 60 weight percent based on total amount of polymer present of the HIPS component.

Total rubber content (based on total diene content from copolymer and homopolymer) arising from the HIPS component in the films of the present invention is 1 wt % or more, preferably 3 wt % or more and 5 wt % or less based on total film weight.

The polymer composition of the present film contains a crystal polystyrene, also called a general purpose polystyrene (GPPS). GPPS for use in the present invention desirably has a Mw of more than 200,000 g/mol, preferably 280,000 g/mol or more and 350,000 g/mol or less, preferably 320,000 g/mol or less. Measure Mw using to gel permeation chromatography and a known standard. The GPPS desirably has a melt flow rate (MFR) of one or more, preferably 1.2 grams per 10 minutes (g/10 min) or more and desirably 3 g/10 min or less, preferably 2 g/10 min or less. Measure MFR according to ASTM method D1238. The GPPS may be free of or may contain plasticizing agents such as mineral oil, ethylene or propylene glycol, phthalates, or styrenic oligomers. Plasticizing agents, when present, are typically present at a concentration of 4 wt % or less, preferably 3 wt % or less, based on GPPS weight. When present, the plasticizing agent typically comprises one wt % or more of the GPPS weight. Examples of suitable GPPS include STYRON® 665 general purpose polystyrene (STYRON is a trademark of The Dow Chemical Company), STYRON 663, STYRON 685D, STYRON 660, and STYRON 6856E.

Compositions and films of the present invention contain preferably at least 10, more preferably at least about 20, most preferably at least about 35, and at most preferably at most about 50, more preferably at most about 45, most preferably at most about 40 weight percent based on total amount of polymer present of the GPPS component.

The third component of the formulation is at least one styrene block copolymer. The term "styrene block copolymer or styrenic block copolymer" means a polymer having at least one block segment of a styrenic monomer in combination with at least one saturated or unsaturated rubber monomer segment, and more preferably not having a block of polymer that is neither rubber or styrenic. Suitable styrene block copolymers having unsaturated rubber monomer units include, but are not limited to, styrene-butadiene (SB), styrene-isoprene (SI), styrene-butadiene-styrene (SBS), styrene-isoprene-styrene (SIS), α-methylstyrene-butadiene-α-methylstyrene, α-methylstyrene-isoprene-α-methylstyrene, and the like. The term "styrene butadiene block copolymer" is used herein inclusive of SB, SBS and higher numbers of blocks of styrene and butadiene. Similarly, the term "styrene isoprene block copolymer" is used inclusive of polymers having at least one block of styrene and one of isoprene. The structure of the styrene block copolymers useful in the present invention can be of the linear or radial type, and of the diblock, triblock or higher block type. In some embodiments the styrenic block copolymers having at least four different blocks or a pair of two repeating blocks, for example, repeating styrene/butadiene or styrene/ethylene propylene blocks, are desirable. Styrene block copolymers are well within the skill in the art and are commercially available from Dexco Polymers under the trademark VECTOR, from KRATON Polymers under the trademark KRATON, from Chevron Phillips Chemical Co. under the trademark SOLPRENE and K-Resin, and from BASF Corp. under the trade designation Styrolux. The styrene block copolymers are optionally used singly or in combinations of two or more.

The styrenic portion of the block copolymer is preferably a polymer or interpolymer of styrene or its analogs or homologs, including α-methylstyrene, and ring-substituted styrenes, particularly ring-methylated styrenes. Preferred styrenics are styrene and α-methylstyrene, with styrene being especially preferred.

The rubber portion of the block copolymer is optionally either unsaturated or saturated. Block copolymers with unsaturated rubber monomer units may comprise homopolymers of butadiene or isoprene and copolymers of one or both of these two dienes with a minor amount of styrenic monomer. When the monomer employed in butadiene, it is preferred that between about 35 and about 55 mole percent of the condensed butadiene units in the butadiene polymer block have a 1,2-configuration. When such a block is hydrogenated, the resulting product is, or resembles, a regular copolymer block of ethylene and 1-butene (EB). If the conjugated diene employed is isoprene, the resulting hydrogenated product is or resembles a regular copolymer block of ethylene and propylene (EP). Preferred block copolymers have unsaturated rubber monomer units, more preferably including at least one segment of a styrenic unit and at least one segment of butadiene or isoprene, with SBS and SIS most preferred. Among these, styrene butadiene block copolymers are preferred when a cast tenter line is used in manufacturing a film because it has higher clarity and lower haze as compared to SIS. However, in blown film processes, styrene isoprene block copolymers are preferred because of a lower tendency to crosslink forming gels during manufacture as compared to SBS.

Among styrene block copolymers, those which have one, preferably two or more preferably all three of clarity, impact resistance and elastomeric behavior are preferred.

Elastomeric styrene block copolymers are preferred in the practice of the present invention to provide toughness and lower stiffness than would be obtained in the absence of the block copolymer. Elastomeric behavior is indicated by a property of tensile percent elongation at break of advantageously at least about 200, preferably at least about 220, more preferably at least about 240, most preferably at least about 260 and preferably at most about 2000, more preferably at most about 1700, most preferably at most about 1500 percent as measured by the procedures of ASTM D-412 and/or D-882. Industrially, most polymers of this type contain 10-80 wt % styrene. Within a specific type and morphology of polymer, as the styrene content increases the elastomeric nature of the block copolymer decreases.

The block copolymers desirably have a melt flow rate (MFR) of at least about 2, preferably at least about 4 grams per 10 minutes (g/10 min) and desirably at most 20 g/10 min, preferably at most 30 g/10 min. Measure MFR according to ASTM method D1238 Condition G.

Preferred styrene block copolymers are highly transparent (have high, that is preferred ranges of, clarity), preferably having clarity when measured by ASTM D1746 corresponding to at least about 85%, preferably at least about 90% transmission of visible light. This transparency is believed to be due to the very small domain size, which is typically of the order of 20 nm. In block copolymers the domain sizes are determined primarily by block molecular weights.

The styrene block copolymers also are preferably sufficiently impact resistant to add durability in film applications as compared to the durability of films having the same composition (proportion of components) except without the styrene block copolymers. Notched Izod Impact resistance is measured according to the procedures of ASTM D-256 and preferably gives a no break condition when tested at 72° F. or 23° C.

A particularly preferred styrene butadiene block copolymer has a radial or star block configuration with polybutadiene at the core and polystyrene at the tips of the arms. Such polymers are referred to herein as star styrene butadiene block copolymers and are within the skill in the art and commercially available from Chevron Phillips Chemical Co. under the trade designation K-Resin. These polymers contain about 27% butadiene or more in a star-block form and often feature a bimodal molecular weight distribution of polystyrene. The inner polybutadiene segments are of about the same molecular weight while the outer polystyrene segments are of different molecular weight. This features facilitates control of polybutadiene segment thickness, to obtain improved clarity. For high clarity, the polybutadiene segment thickness is preferably about one-tenth of the wavelength of visible spectrum or less.

The styrene block copolymer component is useful for improving toughness and lowering stiffness over that of a composition having the other components but not the block copolymer. However, incorporation of high amounts of a styrene-isoprene-styrene component can tend to obscure the clarity and transparency of the films. The styrene block copolymer is present in an amount preferably of at least about 2 weight percent of the polymers in the film or composition, more preferably at least about 3, most preferably at least about 4, preferably at most about 80, more preferably at most about 75, most preferably at most about 70 weight percent based on weight of the polymers in the film or blend (composition) used to make the film. Within these preferred amounts, when the block copolymer is a styrene-butadiene block copolymer, that is preferably SB or SBS, the amount is preferably at least about 20, more preferably at least about 30, most preferably at least about 40 and preferably at most about 80, more preferably at most about 75, most preferably at most about 70 weight percent based on total weight of polymers in the film or composition. More than about 80 weight percent styrene butadiene block copolymer tends to decrease the 1% secant modulus and glass transition temperature undesirably, possibly such that the film shrinks at low temperatures, for instance below about 80° C. However, because SIS and SIS/SI may result in haze when in amounts of about 10 weight percent or more, lower percentages of styrene-isoprene block copolymer component are preferred. The amount of styrene isoprene block copolymer, when present, is preferably at least about 1, more preferably at least about 2, most preferably at least about 3, and preferably at most about 9, more preferably at most about 8, most preferably at most about 6 weight percent based on total weight of polymers in the blend or film. These amounts are preferred whether the SIS or SI block copolymers are used alone or with other styrene block copolymers.

Films of the present invention have orientation with preferential orientation in the direction that receives the most stretch as the film is formed or processed. The resulting film shrinks preferentially in the direction that was stretched more as the film was manufactured. Machine direction (MD) is along the direction of film transport during or after extrusion or blowing of the film. Transverse direction (TD) is perpendicular to the direction of film transport (MD). Shrinkage is preferentially machine direction orientation (MDO) if more stretch is applied to the MD than to the TD, and TDO if more stretch is applied transverse than machine direction. Preferential TDO causes a film of the present invention to shrink primarily in the TD upon application of heat, for instance in a sleeve label. Preferential MDO results in greater shrink in the machine direction than in the TD as is usually used for ROSO labels.

Films of the present invention have an MDO or TDO ratio (ratio of oriented length to un-oriented length in the direction most stretched, MD or TD, respectively) advantageously of at least about 3:1, preferably at least about 4:1, more preferably at least about 5:1, still more preferably at least about 6:1. Films typically have a TDO ratio greater than their MDO ratio in order to be useful in shrink tube label applications or MDO ratio greater than TDO ratio in order to be useful in ROSO label films. Films having a TDO for sleeve applications or MDO for ROSO applications of less than 3:1 tend to have insufficient directional orientation (DO), either MDO or TDO depending on the use, to conform to a container in a shrink label application. There is no clear upper limit for DO ratio, although films typically have a DO ratio of 10:1 or less. Films having an DO ratio greater than 10:1 risk shrinking around a container in a label application to such an extent that a glue seam holding the label around the bottle can weaken or fail.

Measure MDO ratio and TDO ratio by using an oriented film sample 4" (10.16 cm) in both MD and TD (that is, square samples). Place the sample in a heated air oven at 120° C. for 10 minutes and then measure MD and TD dimensions again. The ratio of pre- to -post-heated MD and TD dimensions correspond to MDO ratio and TDO ratio, respectively.

Films of the present invention desirably demonstrate a shrinkage at 110° C., preferably at 100° C., of at least about 20%, preferably at least about 30%, advantageously at least about 40%, preferably at least about 50%, more preferably at least about 60%, most preferably at least about 70% in the more stretched direction. Shrinkage below 20% tends to undesirably limit the extent to which a film can conform to a container contour. While an upper limit on the extent of directional shrink is unknown, it will be below 100%.

Desirably, the films demonstrate a opposite directional shrinkage at 100° C., preferably at 110° C. of at least about 5%, more preferably at least about 7, most preferably at least about 10 percent in the direction of least shrink. Films having a shrink in the direction of less shrink of less than about 5% tend to suffer from poor integrity upon handling and fracture upon bending. Therefore, some orientation and shrink is desirable to enhance film integrity. Extensive shrink in the less stretched direction hinders the film's performance in shrink label applications by resulting in contraction of the film and, hence, distortion of the label in the other direction. Therefore, films of the present invention typically have an orientation ratio in the less stretched direction at most about 1.2:1, preferably at most about 1.15:1, corresponding to a shrink of at most about 20%, preferably at most about 15%.

Films of the present invention further desirably demonstrate no more than about 10% increase in length (growth) in the direction opposite the main shrink direction in the direction opposite primary stretch at 110° C., preferably at 100° C. (Films that shrink more than 20% or grow more than 10% in that direction at the specified temperatures tend to complicate conformation of a film to a container in shrink label applications due to distortions in that direction.) Measure shrinkage according to ASTM method D-1204. Films of the present invention further desirably demonstrate relatively low growth in the direction not purposely stretched, or direction less stretched, in test methods according to U.S. Pat. No. 6,897, 260 B2.

The presence of the HIPS component provides films of the present invention with a desirable high clarity and transparency while at the same time enhancing the toughness of the films. Clarity and transparency are desirable in the label industry to provide a non-obscured view of a product around which the label resides. High clarity and transparency are also desirable for "reverse" printing of labels where printing resides between the label and the container and a consumer views the printing through the label. Typically, films of the present invention have clarity values at a film thickness of 2.0 mils (50 μm) of at least about 10, advantageously at least about 15, preferably at least about 20, more preferably at least about 25, most preferably at least about 30 when prepared on commercial equipment, that is, equipment used to manufacture commercial label films. Those skilled in the art recognize that thicker films will have less clarity than thinner films of the same composition made the same way. Measure clarity according to ASTM method D-1746.

Haze values also provide a measure of a film's observed clarity, with low haze corresponding to high clarity. Haze values for films of the present invention can range to any conceivable value. However, one advantage of the present invention is the ability to obtain oriented films with high clarity and low haze. Typical haze values for the present films at a film thickness of 2.0 mils (50 μm) are at most about 15, preferably at most about 10, more preferably at most about 6, most preferably at most about 4. Measure haze according to ASTM method D-1003.

A styrene-based film advantageously has a higher secant modulus than, for example, oriented polypropylene or oriented polyvinyl chloride films. Increasing the secant modulus of a shrink label film is desirable to hinder the films likelihood of stretch during printing. As a result, films of the present invention can run at faster print speeds without risk of film breakage or distortion relative to a film with a lower secant modulus without the HIPS component. Films of the present invention have a one percent secant modulus in both the MD and TD of at least about 90,000 pounds-per-square-inch (psi) (620 MegaPascals (MPa)), preferably at least about 100,000 psi (690 MPa), more preferably at least about 200,000 psi (1,380 MPa). Measure one percent secant modulus by American Society for Testing and Materials (ASTM) method D-882.

Similar to films with high secant modulus, films with a high tensile stress at break, particularly in the MD, are desirable so that films can run faster and under higher tension in printing processes without stretching than films with a lower tensile stress. Desirably, films of the present invention have a tensile stress at break of at least about 2,000 psi (14 MPa), preferably at least about 2,500 psi (17 MPa), more preferably at least about 3000 psi (21 MPa) and most preferably at least about 4,000 psi (28 MPa). Measure tensile stress at break by ASTM D-882.

Films with a high tensile strain at break are desirable to allow printing and handling of the films with high speed processing equipment without splitting the film. Desirably, films of the present invention have a tensile strain at break in both directions of testing of at least about 30 percent, preferably at least about 35 percent, more preferably at least about 40 percent and most preferably at least about 45 percent. Measure percent strain at break by ASTM D-882. Desirably, films of the present invention have a toughness as measured by the procedures of ASTM D-882 of at least about 2,000 psi (14 MPa), preferably at least about 2,500 psi (17 Mpa), more preferably at least about 3000 psi (21 Mpa) and most preferably at least about 4,000 psi (28 Mpa).

Films of the present invention generally have a thickness of at least about one mil (25 μm), preferably at least about 1.5 mils (38 μm) and generally at most about 4 mils (100 μm), preferably at most about 3 mils (76 μm). At a thickness of less than one mil (25 μm), films tend to be undesirably difficult to cut during processing and handling. Thicknesses greater than 4 mils (100 μm) are technically achievable, but generally economically undesirable.

Films of the present invention desirably have an orientation release stress (ORS) of 400 psi (2758 kPa) or less. ORS is a measure of the stress the film experiences during shrinkage upon heating. Lowering ORS values in a shrink film is desirable. Shrink films typically have at least one end glued to a container around which the film is applied. Labels with high ORS values can apply sufficient stress to a glue seam holding the label around a container during shrinkage so as to damage or break the seam. Lowering ORS values decreases the likelihood that the seam line (film on film) becomes damaged or broken during shrinkage.

Prepare films of the present invention by any means of oriented film manufacture including blown film process and cast-tentering processes. Particularly desirable are blown film processes such as those described in U.S. Pat. No. 6,897,260 and Great Britain Patent (GBP) 862,966 (both of which are incorporated herein by reference).

To avoid unintended crosslinking, processing temperatures and residence times should be minimized. Melt temperatures are preferably below about 230° C., preferably below about 220° C., more preferably below about 210° C. The higher the process melt temperature the shorter the polymer can be kept at that temperature before unacceptable degradation. For instance, exposure to temperatures in excess of about 230° C. is preferably limited to less than about 10 minutes, more preferably less than about 7 minutes, most preferably less than about 300 seconds.

One suitable process ("Process A") for preparing films of the present invention is a blown film process using an apparatus as described in U.S. Pat. No. 6,897,260 or GBP 862,966. Feed polymer pellets to the apparatus and convert them to a polymer melt having a temperature within a range of from 170° C. to 100° C.; then cool the polymer melt to a temperature within a range of from 130° C. to 170° C. to increase melt viscosity before extruding the polymer melt through a blown film die into a gaseous atmosphere. Maintain the gaseous atmosphere at a temperature at least 40° C. below the heat distortion temperature of the each polymer composition component(s) (HIPS component and if present GPPS and/or styrene block copolymer component) in the polymer melt. Blow the extruded polymer melt according to the bubble process of GBP 862,966.

Another possible blown film process ("Process B") suitable for preparing films of the present invention uses two extruders (Extruder 1 and Extruder 2) in series. Extruder 1 is a 2½ inch (6.35 cm) diameter, 24:1 single screw extruder with five barrel zones, each set at a temperature between 155° C. and 200° C., typically increasing in temperature down the extruder. Extruder 2 is a 3½ inch (8.89 cm) diameter, 32:1 single screw with a barrier mixing screw and five barrel zones, each having temperature set point typically at a temperature from 115° C. and 175° C. Feed polymer pellets into Extruder 1 to plasticize the polymer and pump the polymer to Extruder 2 at a temperature of 200-260° C. The polymer proceeds from Extruder 1 through a transfer line and into the entry port of extruder 2. Cool the polymer in Extruder 2 to a melt temperature (extrusion temperature) of selected between 150-190° C. so as to achieve a stable bubble and to optimize orientation release stress (ORS) properties of the resulting film to a desirable value. Cool the polymer by cooling the walls of Extruder 2. Extrude the polymer from Extruder 2 through a 3.25 inch (8.3 cm) annular die and then through a 4.5 inch (11.4 cm) diameter air ring and blow or expand the polymer into a bubble with a diameter that typically ranges from 9 inches (22.9 cm) to 24 inches (63.5 cm). Use the bubble blowing process of GBP 862,966.

In another embodiment, a preferred process for preparing the films is a cast tentering method ("Process C"). First a film or sheet is cast, that is a self-supporting film or sheet is formed from a melt supplied by an extrusion system. The resin is extruded through a slit as a flat sheet, approximately 0.3-2.5 mm thick, onto a cooled, smooth cast roll at a temperature of from about 30 to about 70° C.) to form a monolayer film. The cast roll speed is adjusted to result in the thickness of film to from about 0.3 to about 1 mm thick. This film or sheet carried by rollers into a heated chamber containing a tenter frame. Air in the chamber is heated sufficiently to heat the film or sheet enough to permit stretch without tearing, at a temperature depending on composition of the film, approximately about 95° C. to about 150° C. A tenter frame has two side-by-side endless chains that diverge at constant angle. The film is held onto the chains by film clips. Divergence of the chains forces the polymer to stretch as it is transported along the chain, and imparts the desired orientation. Stretch rate is determined by the chain speed, divergence angle, and extent of orientation. The extent of orientation is determined by the ratio of the width of the film entering to the width of the film leaving the system to achieve amounts of stretch and corresponding shrink described previously. This imparts primarily TD orientation. The film is then annealed, if desired, and released. In most instances, edges of the film are slit off, ground, and recycled, and the film is optionally wound full width or split into narrower widths, which are optionally treated to improve printability and then wound onto rolls for further processing. If desired, machine direction orientation is imparted to the extent previously described, either by machine direction orientation by successively faster rollers at any stage when the film or sheet is sufficiently warm to permit stretch, such as when the film or sheet is formed and before quenching, when heated for TD orientation or in a separate step.

Films of the present invention have utility in any application that benefits from heat triggered shrinkage. The films have a particular utility as shrink labels. To convert a film of the present invention into a shrink label of the present invention, cut the film to a desirably width and corona treat a side of the film (in any order) and then print on the corona treated side of the film. Printing can reside on the "reverse" side of the film to create a reverse printed label. The reverse side of the film resides against a container and printing on the reverse side is viewed through the film when the film is around a container in a shrink label application. These steps are typically done on a continuous web process by any method useful in the art.

Films and labels of the present invention can also advantageously possess perforations through the film or label. Perforations are most desirably located in the portion of a film proximate to the narrowest portion or portions of a container around which the film is applied. The perforations allow gas that would otherwise tend to become trapped between the label and container to escape, thereby allowing the label to more tightly conform to the container. Films, and labels, of the present invention can contain perforations uniformly distributed across a film surface or contain perforations specifically located proximate to the areas of the film (or label), advantageously to the area that will coincide with the narrowest portions of a container around which the film (or label) will reside. Perforation of films and labels of the present invention can be perforated at any time; however, in order to facilitate printing of labels, desirably perforate films and labels after printing.

Objects and advantages of this invention are further illustrated by the following examples. The particular materials and amounts thereof, as well as other conditions and details, recited in these examples should not be used to limit this invention. Unless stated otherwise all percentages, parts and ratios are by weight. Examples of the invention are numbered while comparative samples, which are not examples of the invention, are designated alphabetically.

HIPS-X Component for Examples 1-4 and Comparative Samples B and D

Examples 1-4 and Comparative Samples B and D, hereinafter, utilize HIPS-X as the HIPS component. Produce HIPS-X, for example, in the following continuous process using three agitated reactors working in series. Prepare a rubber feed solution by dissolving the rubber components of Table 1 into styrene at a rubber component ratio of 1 part Diene 55 to 15 parts Buna 6533 (that is, 0.3 wt % Diene 55 and 4.5 wt % Buna 6533 based on total rubber feed solution weight). Incorporate 2.5 wt % mineral oil (70 centistokes kinematic viscosity) and 7 wt % ethyl benzene with the rubber feed solution to form a feed stream, with wt % relative to total feed stream weight. Add 0.1 wt % Antioxidant Irganox 1076 to provide levels of about 1200 parts per million (ppm) in the final product. The balance of the feed is styrene to 100 wt %. Supply the feed stream to the first reactor at a rate of 750 grams per hour (g/h). Target a rubber blend content in the feed stream and the feed rates of styrene and rubber to a reactor to produce a rubber-modified polystyrene product (HIPS-X) containing 4 wt % butadiene.

Each of the three reactors has three zones with independent temperature control. Use the following temperature profile: 125, 130, 135, 143, 149, 153, 157, 165, 170° C. Agitate at 80 revolutions per minute (RPM) in the first reactor, 50 RPM in the second reactor and 25 RPM in the third reactor. Add 100 ppm of chain transfer agent (n-Dodecyl Mercaptan or nDM) into the second zone of the first reactor.

Use a devolatilizing extruder to flash out residual styrene and ethylbenzene diluent and to crosslink the rubber. The temperature profile for the devolatilizing extruder is 240° C. at the start of the barrel, medium zone of the barrel and final zone of the barrel. The screw temperature is 220° C.

Use the following test methods (or methods defined previously herein) to characterize HIPS-X: Melt Flow Rate: ISO-133. PS Matrix molecular weight distribution: PS calibration Gel Permeation Chromatography. Rubber Particle size: Light scattering using an LS230 apparatus and software from Beckman Coulter. Tensile Yield, Elongation and Modulus: ISO-527-2.

Determine the gel concentration of HIPS-X by methyl ethyl ketone extraction. For analyzing HIPS-X, dissolve a 0.25 gram sample of HIPS-X into a methyl ethyl ketone/methanol mixture (10:1 volume ratio) by placing the sample and mixture into a tube of known weight and agitating on a wrist shaker for two hours at room temperature (23° C.). Isolate an insoluble fraction by placing the tube in a high speed centrifuge and spinning at 19500 revolutions per minute at 5° C. for one hour. Decant off excess liquid and place the tubes in a vacuum oven at 150° C. for 45 minutes at a vacuum of 2-5 millimeters of mercury. Remove the tubes from the oven and allow to cool to approximately 23° C. Weigh the tubes to determine, subtract the known weight of the tube to determine gel weight. The gel weight divided by 0.25 grams and multiplied by 100 provides the wt % gel content relative to total HIPS-X weight.

TABLE 1

| Property | Conjugated Diene Copolymer rubber | Conjugated Diene Homopolymer Rubber |
| --- | --- | --- |
| | Buna BL 6533 T (trademark of Bayer) | Diene 55 (Trademark of Firestone) |
| Styrene Content (%) | 40 | 0 |
| Vinyl Content (%) | 9 | 11 |
| Cis Content (%) | 38 | 38 |
| Viscosity (Mooney viscosity ML1 + 4 100° C. in Pascal-Seconds) | 45 | 70 |
| Solution Viscosity (5.43% in toluene) milliPascal-Seconds | 40 | 170 |
| Polymer Structure | AB Block copolymer | Generally linear |

HIPS-X has a volume average rubber particle size of 0.35 µm with 65 vol % of the particle having a size of less than 0.4 µm and 35 vol % of the particles having a size of 0.4-2.5 µm. HIPS-X has a rubber concentration of 0.38 wt % butadiene homopolymer and 5.6 wt % styrene/butadiene copolymer, for a combined rubber concentrations of 5.98 wt % based on HIPS-X weight. HIPS-X has a gel concentration of approximately 8 wt %, relative to total HIPS-X weight. HIPS-X contains 2 wt % mineral oil, has a MFR of 7.0 g/10 min, Vicat temperature of 101° C., Tensile Yield of 20 megaPascals (Mpa), elongation at rupture of 25% and tensile modulus of 2480 Mpa.

The following materials are used in addition to HIPS-X in the Examples of the Invention and some Comparative Samples:

GPPS-1 is a general purpose polystyrene having a tensile modulus of greater than 400,000 psi (2750 Mpa) commercially available from The Dow Chemical Company under the trade designation STYRON™ 665 Polystyrene Resin.

Block-1 is a styrene-butadiene (SB) block copolymer having diene content greater than 30 weight percent and flexural modulus of less than 200,000 (1380 Mpa) commercially available from Chevron-Phillips Chemical Company under the trade designation K-Resin™ KK38 styrene-butadiene-styrene resin.

Block-2 is a styrene-isoprene-styrene/styrene-isoprene (SIS/SI) block copolymer having a styrene content of about 15 weight percent and a SHORE A hardness of 24 (ASTM D-2240) commercially available from Dexco Polymers LP under the trade designation VECTOR™ 4114A Styrene-Isoprene-Styrene/Styrene-Isoprene SIS/SI Styrenic Block Copolymer.

Block-3 is a styrene-isoprene-styrene (SIS) block copolymer having a styrene content of about 18 weight percent and a SHORE A Hardness of 39 commercially available from Dexco Polymers LP under the trade designation VECTOR® 4111A Styrene-Isoprene-Styrene (SIS) Styrenic Block Copolymer.

Block-4 is a thermoplastic styrene-butadiene block copolymer having a styrene content from 70 to 80 weight percent and a tensile modulus of 120,000 psi (825 Mpa) commercially available from BASF Corporation under the trade designation Styrolux™ 3G55 Q420 styrene-butadiene-styrene block copolymer.

Procedure for Examples 1-4 and Comparative Samples B-D

In each of the following examples each component listed in Table 2 is in pellet form, scooped into a tumble blender where the components are mixed for about 2 minutes to form an admixture. No additives are added but it is recognized that some of the commercial polymers used may contain additives as commercially available.

The admixture is placed into each of 3 one inch (2.54 cm) diameter extruders, each having a length to diameter (L/D) ratio of 24:1. The admixtures are heated to a temperature of 390° F. (198° C.) by heaters integral to the extruders. That temperature is maintained until the film is cast through a die with a 10 inch (25.4 cm) wide slit with a gap of 0.040 inches (0.10 cm) onto a water/glycol cooled smooth cast roll at a temperature of 130° F. (54° C.) to form a monolayer film in each instance. The cast roll speed is adjusted to result in the thickness of film listed in each Example or Sample.

The film examples and samples are then cut to 4" (10.16 cm) squares and stretched with a T. M. Long Film Stretching Machine commercially available from T. M. Long Co., Inc of Somerville, N.J. The film stretcher has a sample holder with several edge clamps for each of the four edges of a sample. Hot air is blown from below onto the sample that is suspended in air by the clamps. A diverter is below the sample holder to divert the hot air from blowing directly onto the sample. When the diverter is absent hot air blows on the sample. Each film example or sample is heated at an air temperature indicated in Table 2 for one minute with a diverter in and out for the periods designated in Table 2. Then the sample or example is stretched at a rate of 0.4 inch/second (1.0 cm/s) until the film is stretched 4 times its original dimension in the transverse direction of extrusion and constrained to no stretch in the machine direction by edge clamps.

In the Examples and Comparative samples, the air temperatures are varied to avoid tearing of the samples by the edge clamps. The selected air temperature is selected by a dial indicator on the machine and maintained by the machine. The length of time the diverter is in or out is selected to avoid tearing the sample during stretching because it has the effect of changing the sample temperature.

Examples (Ex) 1-4 and Comparative Samples (C.S.) B.-D

TABLE 2

Weight Percentages of Components and Thickness of Films

| | Example or Sample number | | | | | | |
|---|---|---|---|---|---|---|---|
| | Ex. 1 | Ex. 4 | C.S. B | Ex. 2 | Ex. 3 | C.S. C | C.S. D |
| HIPS-X wt % | 30 | 50 | 65 | 20 | 60 | | 30 |
| GPPS-1 wt % | 30 | 40 | 35 | 20 | 35 | | |
| BLOCK-1 wt % | 40 | | | 60 | | | |
| BLOCK-2 wt % | | 10 | | | | | |
| BLOCK-3 wt % | | | | | 5 | | |
| BLOCK-4 wt % | | | | | | 100 | 70 |
| thickness | 10 mil (0.25 mm) | 15 mil (0.38 mm) | 15 mil (0.38 mm) | 15 mil (0.38 mm) | 15 mil (0.38 mm) | 15 mil (0.38 mm) | 15 mil (0.38 mm) |
| Stretch air temperature | 125° C. | 130° C. | 135° C. | 125° C. | 135° C. | 115° C. | 130° C. |
| Stretch diverter "in" period in seconds | 30 | 30 | 30 | 30 | 30 | 15 | 15 |

TABLE 2-continued

Weight Percentages of Components and Thickness of Films

| | Example or Sample number | | | | | | |
|---|---|---|---|---|---|---|---|
| | Ex. 1 | Ex. 4 | C.S. B | Ex. 2 | Ex. 3 | C.S. C | C.S. D |
| Stretch diverter "out" period in seconds | 30 | 30 | 30 | 45 | 30 | 15 | 15 |

All percentages are weight percentages of polymers present exclusive of additives except those that may be in the commercial products as obtained.
*Comparative Samples are not examples of the present invention.

Table 3 illustrates film properties for Ex 1-4 and C.S. B-D. Use the following test methods to characterize films throughout the present disclosure. Measure Haze according to the procedures of ASTM method D-1003. Measure Clarity according to the procedures of ASTM method D-1746. Measure Tensile Stress and Strain, Toughness and Secant Modulus according the procedures of ASTM method D-882. Measure orientation release stress (ORS) according to the procedures of ASTM method D-2838. Measure Free Air Shrink according to the procedures of ASTM method D-1204.

TABLE 3

Properties of Films of Examples 1-4 and Comparative Samples B-D:

| Property | Ex 1 | Ex 4 | Comp B | Ex 2 | Ex 3 | Comp C | Comp D |
|---|---|---|---|---|---|---|---|
| Prestretched Thickness, mils | 10 | 15 | 15 | 15 | 15 | 15 | 15 |
| Prestretched thickness μm | 254 | 381 | 381 | 381 | 381 | 381 | 381 |
| thickness, mils | 2.50 | 3.50 | 4.10 | 3.90 | 4.10 | 3.50 | 4.30 |
| Stretched thickness μm | 64 | 89 | 104 | 99 | 104 | 89 | 109 |
| Clarity** | 2.70 | 0.60* | 3.26 | 1.52 | 1.26 | 33.60 | 3.80 |
| Haze | 13.10 | 43.20* | 6.80 | 11.00 | 13.00 | 1.90 | 18.10 |
| Tensile Stress at Break, MD psi | 3,740 | 3,540 | 5,490 | 2,920 | 3,550 | 4,620 | 4,480 |
| Converted to MPa | 26 | 24 | 38 | 20 | 24 | 32 | 31 |
| Tensile Stress at Break, TD psi | 7,560 | 4,880 | 6,360 | 6,010 | 6,820 | 6,050 | 4,300 |
| Converted to MPa | 52 | 34 | 44 | 41 | 47 | 42 | 30 |
| Tensile Strain at Break, MD % | 73 | 81 | 3 | 256 | 54 | 410 | 360 |
| Tensile Strain at Break, TD % | 104 | 55 | 53 | 117 | 95 | 160 | 160 |
| Toughness, MD, psi | 3,030 | 2,890 | 70 | 7,240 | 1,970 | 10,910 | 11,080 |
| Converted to MPa | 21 | 20 | 0 | 50 | 14 | 75 | 76 |
| Toughness, TD, psi | 6,080 | 2,790 | 3,030 | 5,220 | 5,580 | 6,380 | 5,510 |
| Converted to MPa | 42 | 19 | 21 | 36 | 38 | 44 | 38 |
| 1% Secant Modulus, MD, psi | 158,000 | 210,000 | 264,000 | 103,000 | 161,000 | 54,000 | 97,000 |
| Converted to MPa | 1089 | 1448 | 1820 | 710 | 1110 | 372 | 669 |
| 1% Secant Modulus, TD, psi | 263,000 | 263,000 | 307,000 | 177,000 | 264,000 | 62,000 | 109,000 |
| Converted to MPa | 1813 | 1813 | 2117 | 1220 | 1820 | 427 | 752 |
| Free Air Shrink, MD 80 C., 10 min | 0.0 | 0.0 | 0.0 | 0.0 | 0.0 | −2.9 | −1.7 |
| Free Air Shrink, TD 80 C. 10 min | 0.0 | 0.0 | 0.0 | 0.0 | 0.0 | 28.0 | 12.2 |
| Free Air Shrink, MD 100 C., 10 min | 3.9 | −2.0 | −2.7 | −1.6 | −2.7 | −2.9 | −4.7 |

TABLE 3-continued

Properties of Films of Examples 1-4 and Comparative Samples B-D:

| Property | Ex 1 | Ex 4 | Comp B | Ex 2 | Ex 3 | Comp C | Comp D |
|---|---|---|---|---|---|---|---|
| Free Air Shrink, TD 100 C. 10 min | 48.9 | 14.9 | 27.0 | 30.3 | 21.3 | 62.0 | 48.0 |
| Free Air Shrink, MD 110 C., 10 min | 12.6 | 3.9 | 1.2 | −2.9 | −3.3 | 7.0 | 2.0 |
| Free Air Shrink, TD 110 C. 10 min | 63.8 | 57.2 | 55.1 | 66.6 | 57.1 | 73 | 54 |

*It is believed, but not confirmed, that the relatively high haze and lack of clarity of this sample may be at least partially the result of one or more additives in Block-2 as received.
**Clarity obtained using this laboratory equipment is lower than would be expected for the same compositions prepared on commercial equipment. It is believed that this data indicates that the clarity of Ex. 1, 2 and 3 would be within preferred ranges if prepared on commercial equipment.

Examples 1-4 illustrate a variety of formulations within the scope of the invention and show that their properties are appropriate for making shrink labels. Example 4 also illustrates that the use of excess SIS may result in more haze than may be desirable for some shrink labels. Comparative Sample B illustrates that the absence of styrene block copolymer results in lower MD toughness than is useful for shrink labels because such labels will be observed to split easily along the unstretched direction. Comparative Sample C illustrates that labels without HIPS-X have a low modulus, this labels made with such a formulation will be observed to have undesirably low stiffness. Comparative Sample D illustrates that a label without GPPS has more haze than is desirable for shrink labels.

Comparison of Comparative Sample C and Comparative Sample D shows that the addition of HIPS-X to a block copolymer results in higher stiffness as indicated by higher one percent secant modulus.

Preferred embodiments of the invention include but are not limited to:

1. A film composition comprising from 0 to 5 weight percent additives and from 95 to 100 weight percent of a polymer composition consisting essentially of:
   (a) At least one high impact polystyrene (HIPS) component having:
      (i) a block copolymer of styrene and a rubbery conjugated diene, wherein the copolymer is grafted to a polystyrene;
      (ii) optionally, two weight-percent or more and 8 weight-percent or less of a rubbery conjugated diene homopolymer based on total rubber weight in the HIPS component.
      (iii) a total diene-component content from the rubber component of one weight percent or more and seven weight percent or less based on total weight of the HIPS component;
      (iv) less than 10 wt % gel concentration by methyl ethyl ketone/methanol extraction;
      (v) an average rubber particle size of less than 1.0 micrometers and 0.01 micrometers or more;
      (vi) about 40 to about 90 volume percent of the rubber particles with diameters of less than about 0.4 microns and from about 10 to about 60 volume percent of the rubber particles with diameters between about 0.4 and about 2.5 microns;
      (vii) a majority of rubber particles with a core/shell morphology;
      (viii) that is present at a concentration of at least about 10 weight percent and up to at most about 70 weight percent of the polymers in the composition and accounts for one or more and five or less percent by weight of rubbery diene weight relative to total composition weight
   (b) at least one general purpose polystyrene having a weight-average molecular weight of more than 200,000 grams per mole and 350,000 grams per mole or less and that is present at a concentration of at least about 10 weight percent and up to at most about 50 weight percent of the polymers in the composition; and
   (c) at least one styrene block copolymer having a tensile elongation at break of advantageously at least about 200 and a melt flow rate as determined by the procedures of ASTM D1238, Condition G, of at least about 2 g/10 min and that is present at a concentration of at least about 2 weight percent and up to at most about 80 weight percent of the polymers in the composition;

wherein, the total combination of (a), (b) and (c) accounts for 100 wt % of the polymer composition.

2. The composition of Embodiment 1 wherein the styrene block copolymer has clarity when measured by ASTM D1746 corresponding to at least about 85%, preferably at least about 90% transmission of visible light.

3. The composition of Embodiment 1 or 2 wherein one or more of the HIPS, the GPPS, the styrene block copolymer are selected and used in amounts effective to achieve at least one, advantageously at least 2, more advantageously at least 3, most advantageously at least 4, preferably at least 5, more preferably at least 6, most preferably at least 7 of the following when the composition is used to make a film having a thickness preferably as designated in the procedure specified for measurement of the properties, alternatively at a thickness intended for use, preferably from about 25 or 38 μm to about 76, 100 or 110 μm, more preferably a stretched thickness of 64, 65, 89, 90, 100, 104, 105, 109, or 110 μm, most preferably a stretched thickness of 50 μm:
   (a) a clarity corresponding to that of a 50 μm film of at least about any of 10, 15, 20, 25 or 30 as measured according to the procedures of ASTM D-1746;
   (b) a haze corresponding to that of a 50 μm film of less than about any of 15, 10, 6, or 4 as measured according to the procedures of ASTM D-1003;
   (c) a 1% secant modulus in MD, TD or, more preferably both, of at least about any of 620 MPa, 680 MPa, or 1380 MPa as measured according to the procedures of ASTM D-882;
   (d) a tensile strain at break in the MD, TD or, more preferably both, of at least about any of 30, 35, 40, or 45 percent as measured according to the procedures of ASTM D-882;
   (e) a tensile stress at break in the MD, TD or, more preferably both, of at least about any of 14, 17, 21 or 28 MPa as measured according to the procedures of ASTM D-882;

(f) a toughness in the MD, TD or, more preferably both, of at least about any of 14, 17, 21 or 28 MPa as measured according to the procedures of ASTM D-882;

(g) an orientation release stress less than 2758 kPa as measured according to the procedures of ASTM D-2838.

4. The composition of any of Embodiments 1 through 3, wherein the high impact polystyrene component has a volume average rubber particle size of 0.5 micrometers or less and 0.01 micrometers or more.

5. The composition of any of Embodiments 1 through 4, wherein the amount of (a) HIPS is at least about any of 10, or 25 wt %, at most about any of 60, 65 or 70 wt %, the (b) GPPS is at least about any of 10, 20 or 35 wt %, at most about any of 40, 45 or 50 wt % or (c) styrene block copolymer component is at least about 2, 3, or 4 wt %, at most about 70, 75 or 80 wt % based total weight of polymer components (a), (b) and (c) or any combination thereof.

6. The composition of any of Embodiments 1-5 wherein the styrene block copolymer is at least one styrene butadiene block copolymer and is present in an amount of at least about 20, 30, or 40 wt %, or at most about 70, 75 or 80 wt % based on total weight of (a), (b) and (c).

7. The composition of any of Embodiments 1-6 wherein the styrene block copolymer is at least one styrene isoprene block copolymer and is present in an amount of at least about 2, 3, or 4 wt %, or at most about 6, 8, or 9 wt % based on total weight of (a), (b) and (c).

8. The composition of any of Embodiments 1-7, wherein the rubbery conjugated diene in the copolymer of (a) is butadiene.

9. The composition of any of Embodiments 1-8, wherein 90 percent or more of the rubber particles have a particles have a particle size of less than 0.4 micrometers and the balance of the rubber particles to 100 percent have a particle size of 2.5 micrometers or less.

10. A film comprising the composition of any of Embodiments 1-9.

11. The film of Embodiment 10, wherein the film demonstrates a growth of less than 10% in the direction of less stretch after 5 minutes in a heated air oven at 110 degrees Celsius.

12. The film of any of Embodiments 10-11 wherein the polymer composition accounts for at least 95 wt % of the oriented film weight with the balance to 100 wt % selected from additives; and wherein the film has a directional orientation in the direction stretched of at least about 3:1.

13. The film of any of Embodiments 10-12, wherein the film has a machine direction (MD) and transverse direction (TD) one-percent secant modulus per American Society for Testing and Materials method 882 of at least about 250,000 pounds per square inch (1,724 MegaPascals).

14. The film of any of Embodiments 10-13, having a thickness preferably of from about 25 or 38 µm to about 76, 100 or 110 µm, more preferably a thickness of any of 64, 65, 89, 90, 100, 104, 105, 109, or 110 µm, most preferably a thickness of 50 µm.

15. The film of any of the Embodiments 10-14 at any thickness specified in Embodiment having at least one, advantageously at least 2, more advantageously at least 3, most advantageously at least 4, preferably at least 5, more preferably at least 6, most preferably at least 7 of the properties specified in Embodiment 3.

16. The film of any of Embodiments 10-15 wherein the film has one or both of (a) a ratio of oriented to unoriented length of in the direction most stretched of at least about 3:1, 4:1, 5:1 or 6:1 or (b) a ratio of oriented to unoriented length in the direction perpendicular to the direction of most stretch (also known as direction of least stretch) of at least about 1.05:1, 1.07:1 or 1.10:1 to at most about 1.2:1 or 1.15:1.

17. The film of any of Embodiments 10-16 wherein the film has one or both of (a) a shrink in the direction most stretched of at least about 20, 30, 40, 50, 60, or 70 percent; or (b) a shrink in the direction of least stretch of from any of 5, 7 or 10 percent to any of 15 or 20 percent.

18. The film of any of Embodiments 10-17 further comprising perforations.

19. A shrink label comprising an oriented polymer film of any of Embodiments 10-18, preferably wherein the film has printing on one or both sides.

What is claimed is:

1. A film composition comprising from 0 to 5 weight percent additives and from 95 to 100 weight percent of a polymer composition consisting essentially of:
   (a) at least one high impact polystyrene (HIPS) component having:
      (i) a block copolymer of styrene and a rubbery conjugated diene, wherein the copolymer is grafted to a polystyrene;
      (ii) optionally, two weight-percent or more and 8 weight percent or less of a rubbery conjugated diene homopolymer based on total rubber weight in the HIPS component;
      (iii) a total diene-component content from the block copolymer and optional rubbery conjugated diene homopolymer grafted into the polystyrene of the HIPS component, hereinafter rubber component, of one weight percent or more and seven weight percent or less based on total weight of the HIPS component;
      (iv) less than 10 wt % gel concentration by methyl ethyl ketone/methanol extraction;
      (v) an average rubber particle size of less than 1.0 micrometers and 0.01 micrometers or more:
      (vi) about 40 to about 90 volume percent of the rubber particles with diameters of less than about 0.4 microns and from about 10 to about 60 volume percent of the rubber particles with diameters between about 0.4 and about 2.5 microns;
      (vii) a majority of rubber particles with a core/shell morphology;
      (viii) that is present at a concentration of at least about 10 weight percent and up to at most about 70 weight percent of the polymers in the composition and accounts for one or more and five or less percent by weight of rubbery diene weight relative to total composition weight;
   (b) at least one general purpose polystyrene having a weight-average molecular weight of more than 200,000 grams per mole and 350,000 grams per mole or less and that is present at a concentration of at least about 10 weight percent and up to at most 45 weight percent of the polymers in the composition; and
   (c) at least one styrene butadiene block copolymer having a tensile elongation at break of at least about 200 and a melt flow rate as determined by the procedures of ASTM D1238, Condition G, of at least about 2 g/10 min and that is present at a concentration of at least about 20 weight percent and up to at most about 80 weight percent of the polymers in the composition;
wherein, the total combination of (a), (b) and (c) accounts for 100 wt % of the polymer composition.

2. The composition of claim 1 wherein the styrene block copolymer has clarity when measured by ASTM D1746 corresponding to at least about 85% transmission of visible light.

3. The composition of claim 1, wherein the high impact polystyrene component has a volume average rubber particle size of 0.5 micrometers or less and 0.01 micrometers or more.

4. The composition of claim 1, wherein the amount of styrene block copolymer component is at least about 30 weight percent based on weight of the polymer composition.

5. The composition of claim 1, wherein the rubbery conjugated diene in the copolymer of (a) is butadiene.

6. The composition of any of claim 1, wherein 90 percent or more of the rubber particles have a particles have a particle size of less than 0.4 micrometers and the balance of the rubber particles to 100 percent have a particle size of 2.5 micrometers or less.

7. The composition of claim 1 wherein one or more of the HIPS, the GPPS, the styrene block copolymer are selected and used in amounts effective to achieve at least 3 of the following when the composition is used to make a film having a thickness designated in the procedure specified for measurement of the property, or, if the thickness is not specified at a thickness of 100 μm:
   (a) a clarity corresponding to that of a 50 μm film of at least about 10 as measured according to the procedures of ASTM D-1746;
   (b) a haze corresponding to that of a 50μm film of less than about 15 as measured according to the procedures of ASTM D-1003;
   (c) a 1% secant modulus in MD, TD or, more preferably both, of at least about 620 MPa as measured according to the procedures of ASTM D-882;
   (d) a tensile strain at break in the MD, TD or, more preferably both, of at least about 45 percent as measured according to the procedures of ASTM D-882;
   (e) a tensile stress at break in the MD, TD or, more preferably both, of at least about 21 MPa as measured according to the procedures of ASTM D-882;
   (f) a toughness in the MD, TD or, more preferably both, of at least about 14 MPa as measured according to the procedures of ASTM D-882; or
   (g) an orientation release stress less than 2758 kPa as measured according to the procedures of ASTM D-2838.

8. A film comprising the composition of claim 1.

9. The film of claim 8, wherein the film demonstrates a growth of less than 10% in the direction of less stretch after 5 minutes in a heated air oven at 110 degrees Celsius.

10. The film claim 8 wherein the polymer composition accounts for at least 95 wt % of the oriented film weight with the balance to 100 wt % selected from additives; and wherein the film has a directional orientation in the direction stretched of at least about 3:1.

11. The film of claim 8, wherein the film has a machine direction (MD) and transverse direction (TD) one-percent secant modulus per American Society for Testing and Materials method 882 of at least about 250,000 pounds per square inch (1,724 MegaPascals).

12. The film of claim 8 wherein the film has a shrink in the direction most stretched of at least about 50 percent and a shrink in the direction least stretched of from 5 to 20 percent.

13. The film of claim 8, further comprising perforations.

14. A shrink label comprising an oriented polymer film of claim 8 wherein the film has printing on one or both sides.

15. A shrink label comprising an oriented polymer film of claim 9 wherein the film has printing on one or both sides.

16. A shrink label comprising an oriented polymer film of claim 10 wherein the film has printing on one or both sides.

17. A shrink label comprising an oriented polymer film of claim 11 wherein the film has printing on one or both sides.

18. A shrink label comprising an oriented polymer film of claim 12 wherein the film has printing on one or both sides.

* * * * *